(12) United States Patent
Thubert et al.

(10) Patent No.: US 8,259,635 B2
(45) Date of Patent: Sep. 4, 2012

(54) AUTOMATIC CLUSTERING OF WIRELESS NETWORK NODES TOWARD SELECTED MESH ACCESS POINTS

(75) Inventors: Pascal Thubert, La Colle sur Loup (FR); Patrick Wetterwald, Mouans Sartoux (FR); Vincent Jean Ribiere, Biot (FR); Stefano Alessandro Crosta, Biot (FR)

(73) Assignee: Cisco Technology, Inc., San Jose, CA (US)

( * ) Notice: Subject to any disclaimer, the term of this patent is extended or adjusted under 35 U.S.C. 154(b) by 1255 days.

(21) Appl. No.: 11/969,244

(22) Filed: Jan. 4, 2008

(65) Prior Publication Data

US 2009/0175208 A1  Jul. 9, 2009

(51) Int. Cl.
*H04H 20/71* (2008.01)
*H04W 4/00* (2009.01)

(52) U.S. Cl. ........................ 370/312; 370/338
(58) Field of Classification Search .................. 370/312, 370/252, 238, 328
See application file for complete search history.

(56) References Cited

U.S. PATENT DOCUMENTS

| | | | | |
|---|---|---|---|---|
| 6,529,734 | B1 * | 3/2003 | Lagneborg et al. | 455/452.2 |
| 7,190,678 | B2 | 3/2007 | Thubert et al. | |
| 7,203,175 | B2 | 4/2007 | Thubert et al. | |
| 7,313,399 | B2 * | 12/2007 | Rhee et al. | 455/445 |
| 7,532,623 | B2 * | 5/2009 | Rosenzweig et al. | 370/390 |
| 2002/0059453 | A1 * | 5/2002 | Eriksson et al. | 709/238 |
| 2006/0198348 | A1 * | 9/2006 | Lin et al. | 370/338 |
| 2006/0215582 | A1 * | 9/2006 | Castagnoli et al. | 370/254 |
| 2006/0227724 | A1 * | 10/2006 | Thubert et al. | 370/254 |
| 2007/0110024 | A1 * | 5/2007 | Meier | 370/351 |
| 2007/0184807 | A1 * | 8/2007 | Aoki et al. | 455/312 |
| 2008/0095059 | A1 * | 4/2008 | Chu | 370/238 |
| 2008/0192661 | A1 * | 8/2008 | Hamamoto et al. | 370/310 |
| 2008/0298249 | A1 * | 12/2008 | Baker et al. | 370/238 |
| 2009/0010190 | A1 * | 1/2009 | Gong | 370/311 |
| 2009/0046614 | A1 * | 2/2009 | Lewis et al. | 370/312 |
| 2009/0067369 | A1 * | 3/2009 | Stamoulis et al. | 370/328 |
| 2009/0303902 | A1 * | 12/2009 | Liu et al. | 370/254 |
| 2010/0046400 | A1 * | 2/2010 | Wu et al. | 370/256 |
| 2010/0091669 | A1 * | 4/2010 | Liu et al. | 370/252 |

OTHER PUBLICATIONS

U.S. Appl. No. 11/657,662, filed Jan. 25, 2007, Thubert et al.
U.S. Appl. No. 11/729,886, filed Mar. 30, 2007, Thubert et al.
U.S. Appl. No. 11/984,471, filed Nov. 19, 2007, Thubert et al.
Thubert et al., "Nested Nemo Tree Discovery", NEMO Working Group, Internet Draft, <draft-thubert-tree-discovery-06-txt>, Jul. 3, 2007, pp. 1-28.
Boot, "Improving Collision Avoidance for multicast in CSMA", Version 1.0, Oct. 25, 2006, pp. 1-10.
Jacquet et al., "Performance Analysis of OLSR Multipoint Relay Flooding in Two Ad Hoc Wireless Network Models" [online] (2001), [retrieved Oct. 24, 2007]. Retrieved from the Internet:<URL: http://citeseer.ist.psu.edu/cache/papers/cs/28231/http:zSzzSzmenetou.inria.frzSz~viennotzSzpages-bizSz..zSzpostscriptszSzRR-4260.pdf/jacquet01performance.pdf>, pp. 1-29.

* cited by examiner

*Primary Examiner* — John Blanton
(74) *Attorney, Agent, or Firm* — Leon R. Turkevich

(57) ABSTRACT

In one embodiment, a method comprises detecting by a mesh access point a number of wireless network nodes that are attached to the mesh access point within a mesh network; calculating by the mesh access point an attachment preference factor that enables at least one other wireless network node to determine whether to attach to the mesh access point, wherein the mesh access point increases the attachment preference factor based on a corresponding increase in the number of wireless network nodes that are attached to the mesh access point; and outputting by the mesh access point the attachment preference factor, enabling the at least one other wireless network node to determine whether to attach to the mesh access point.

19 Claims, 3 Drawing Sheets

AUTOMATIC CLUSTERING OF WIRELESS NETWORK NODES TOWARD SELECTED MESH ACCESS POINTS

TECHNICAL FIELD

The present disclosure generally relates to deploying a wireless local area network (WLAN) using wireless link protocols, such as IEEE 802.11e and IEEE P802.11s/D.100 wireless Ethernet, based on implementing a mesh network having distributed mesh points in communication with a mesh portal having a wired link to a wide area network.

BACKGROUND

Wireless local area networks are being deployed in large-scale service areas using mesh networking. Mesh networking can utilize mesh points (MPs) to establish a mesh backhaul infrastructure. For example, the IEEE P802.11s/D1.00 specification describes mesh points as devices that support WLAN mesh services, i.e. they participate in the formation and operation of the mesh network. The mesh points can establish a mesh backhaul infrastructure based on establishing peer-to-peer wireless links between each mesh point, and establishing a tree topology that is "rooted" by a "mesh portal": the mesh portal is a mesh point that has a wired link for reaching a wide area network. Mesh points that also serve as "access points" for wireless client devices are referred to as "Mesh Access Points" (MAPs). The distribution of the mesh points can extend wireless coverage of the WLAN over a larger coverage area for wireless user devices.

Mesh networking utilizes routing protocols that enable mesh path selection and forwarding of data packets at the link layer. For example, the IEEE P802.11s specification defines a default mandatory routing protocol (Hybrid Wireless Mesh Protocol, or HWMP). Another example mesh network utilizes a protocol known as Adaptive Wireless Path Protocol (AWP), available for example in the commercially available Cisco Aironet 1500 Series Outdoor Mesh Access Point by Cisco Systems, San Jose, Calif.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
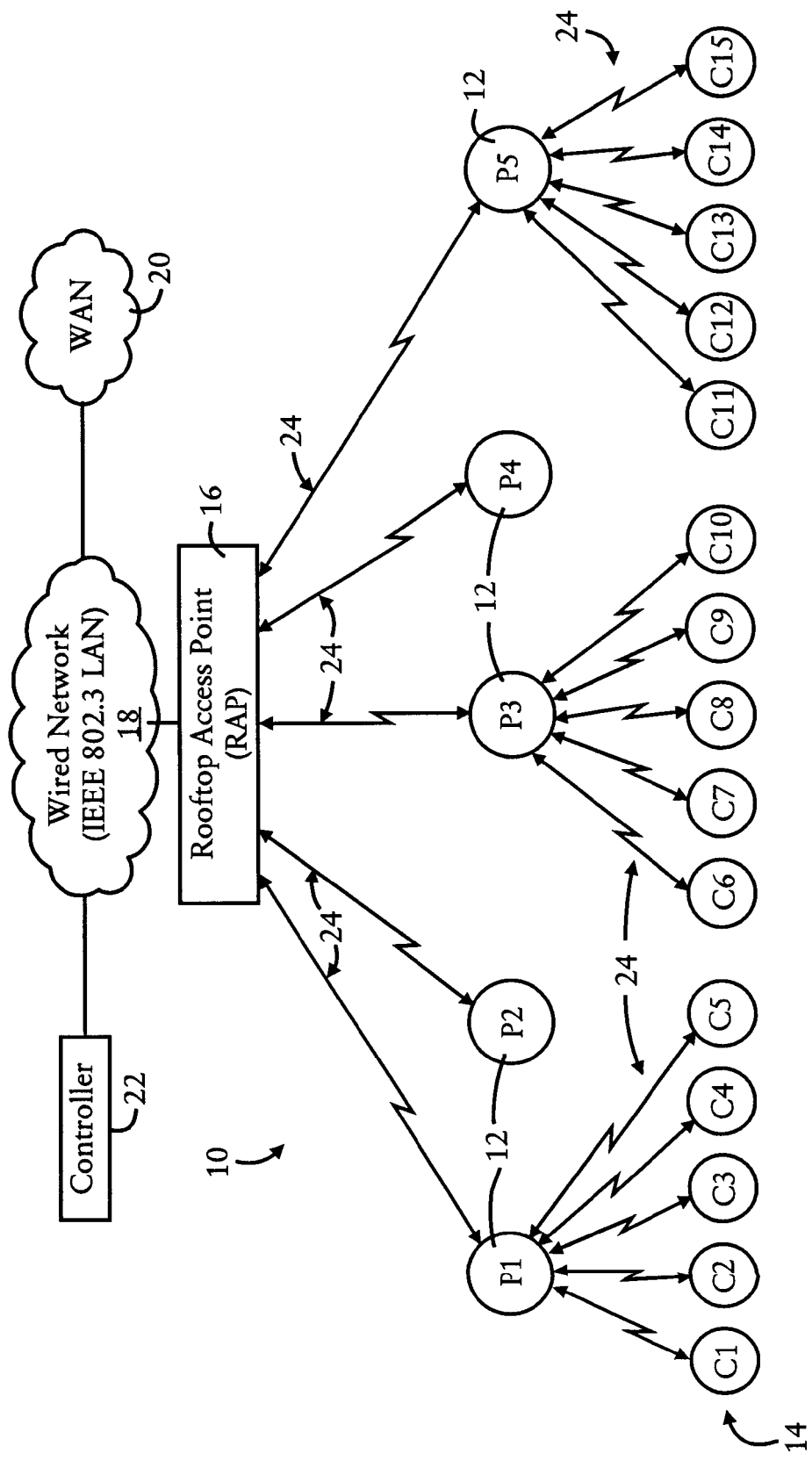
FIG. 1 illustrates an example mesh network having mesh access points choosing attachment preference factors for clustering of wireless network nodes, according to an example embodiment.

In one embodiment, a method comprises detecting by a mesh access point a number of wireless network nodes that are attached to the mesh access point within a mesh network; calculating by the mesh access point an attachment preference factor that enables at least one other wireless network node to determine whether to attach to the mesh access point, wherein the mesh access point increases the attachment preference factor based on a corresponding increase in the number of wireless network nodes that are attached to the mesh access point; and outputting by the mesh access point the attachment preference factor, enabling the at least one other wireless network node to determine whether to attach to the mesh access point.

In another embodiment, an apparatus comprises an attachment preference calculation circuit and a network interface circuit. The attachment preference calculation circuit is configured for detecting a number of wireless network nodes that are attached to the apparatus within a mesh network. The attachment preference calculation circuit also is configured for calculating an attachment preference factor that enables at least one other wireless network node to determine whether to attach to the apparatus. The attachment preference calculation circuit also is configured for increasing the attachment preference factor based on detecting a corresponding increase in the number of wireless network nodes that are attached to the apparatus. The network interface circuit is configured for outputting the attachment preference factor, enabling the at least one other wireless network node to determine whether to attach to the apparatus.

DETAILED DESCRIPTION

Particular embodiments disclosed herein enable wireless network nodes (e.g., mesh access points or wireless host nodes) within a mesh network to automatically attach to a mesh access point (MAP) according to a clustered topology that minimizes overlapping transmission areas between neighboring mesh access points. Each mesh access point can calculate an attachment preference factor based on a detected number of wireless network nodes that are attached to the mesh access point. A wireless network node that is attached to a mesh access point also is referred to herein as "an attached wireless network node". If a mesh access point has a greater number of attached wireless network nodes (i.e., wireless network nodes that are attached to the mesh access point), the mesh access point will calculate (i.e., generate) a corresponding higher attachment preference factor; conversely, if a mesh access point has a lesser number of attached wireless network nodes, the mesh access point will calculate a corresponding lower attachment preference factor. Hence, a mesh access point having no attached wireless network nodes will generate a minimum attachment preference factor.

Each wireless network node can be configured for selecting an attachment access point from among multiple advertising mesh access points based on attaching to the mesh access point advertising the highest corresponding attachment preference factor. The attachment preference factor advertised by a mesh access point can be expressed for example as a cost factor for attaching to the mesh access point (e.g., a higher preference factor can be implemented as a lower cost factor), and/or an ease factor in attaching to the mesh access point (e.g., a higher preference factor can be implemented as a higher ease factor).

Hence, the particular embodiments can cause wireless network nodes to prefer attaching to a mesh access point having a larger number of wireless network nodes that already are attached, resulting in clustering of wireless network nodes about a given mesh access point. Hence, wireless network nodes can migrate from mesh access points having a fewer number of attached wireless network nodes toward mesh access points having more attached wireless network nodes. Consequently, any mesh access point that has no attached wireless node no longer needs to retransmit a received multicast packet, and can therefore suppress retransmission of received multicast packets to prevent interference with a neighboring mesh access point that has attached wireless network nodes within a given transmission area. Hence, the number of multicast transmissions within a mesh network can be reduced.

Hence, the particular embodiments minimize interference between neighboring mesh access points during retransmission of multicast packets from a centralized access point in the mesh network (e.g., a rooftop access point) by enabling clustering around certain mesh access points, enabling the elimination of interference by neighboring mesh access points that have no attached wireless network nodes. The elimination of interference by neighboring mesh access points is particularly effective for retransmission of wireless data packets that do not follow a carrier sense multiple access with collision avoidance (CSMA/CA) protocol, for example multicast packets transmitted according to IEEE P802.11s.

FIG. 1 illustrates an example wireless mesh network 10 having multiple mesh access points (e.g., P1, P2, P3, P4, and P5) 12 and other wireless network nodes (e.g., wireless host devices and/or other mesh access points) 14, according to an example embodiment. Each of the mesh access points 12 can generate a corresponding attachment preference factor (AF) 36, illustrated in FIG. 2, that enables the wireless network nodes 14 to automatically cluster toward selected mesh access points 12. The mesh access points 12 provide connectivity for the attached wireless network nodes 14 to a wired local area network 18 based on wireless connections 24 with a centralized access point 16, also referred to as a "mesh portal" 16 or a "rooftop access point" (RAP) 16. As used herein, the term "centralized access point" refers to an access point that serves at least as a root of a multicast tree for transmission of multicast packets within a multicast domain. The centralized access point 16 can be implemented as a wired mesh access point having a wired connection to the wired local area network (e.g., an IEEE 802.3 LAN) 18, serving as a root for wireless network nodes 12 and 14 that do not have a wired connection. The centralized access point 16 also can provide a wired connection to a wide area network (WAN) 20 and/or a wired device 22 (e.g., a mesh controller) via the LAN 18.

Each of the mesh access points 12 and the wireless network nodes 14 can communicate with the centralized access point 16 via wireless mesh links 24 established between the mesh access points 12 and the centralized access point 16. Each mesh access point (MAP) 12 (and/or 14, if a wireless network node is implemented as a mesh access point) can be implemented for example based on the commercially-available Cisco Aironet Series 1500 Mesh Access Point from Cisco Systems, San Jose, Calif., and based on applying the features described herein. Each MAP 12 (and/or 14, as appropriate) can be controlled by a mesh controller 22 within the wired LAN 18 according to a prescribed lightweight access point protocol, for example a Lightweight Access Point Protocol (LWAPP) commercially available from Cisco Systems, Inc., San Jose, Calif., and described in the Internet Engineering Task Force (IETF) Internet Draft by Calhoun et al., entitled "Light Weight Access Point Protocol", available via the World Wide Web at the site address "ietf.org/internet-drafts/draft-ohara-capwap-lwapp-04.txt".

The wireless mesh network 10 also can be implemented according to existing wireless protocols as promulgated by the Institute for Electrical and Electronic Engineers (IEEE), including IEEE 802.11, IEEE 802.11e and the proposed P802.11s/D1.00. In particular, the wireless nodes 12 and 14 can be implemented using a well-known physical layer (layer 1) and link layer (layer 2) protocol according to the Open Systems Interconnection (OSI) Reference Model: an example protocol is the IEEE 802.11 Specification, which was published by the Institute of Electrical and Electronics Engineers (IEEE) as "IEEE 802.11, Wireless LAN Medium Access Control (MAC) and Physical Layer (PHY) specifications," Standard, IEEE, New York, N.Y., August 1999.

The IEEE also published numerous supplements to the IEEE 802.11 specification, for example the IEEE 802.11a specification, the IEEE 802.11b specification, and the IEEE 802.11e specification, published Nov. 11, 2005 as "IEEE Std 802.11e-2005, IEEE Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications—Amendment 8: Medium Access Control (MAC) Quality of Service (QoS)Enhancements" (ISBN 0-7381-4772-9) (referred to herein as "the IEEE 802.11e specification").

The IEEE also published a proposed standard referred to as IEEE 802.11s and/or IEEE 802.11s/D1.00, published November 2006 as "IEEE P802.11s™/D1.00 Draft Amendment to Standard for Information Technology—Telecommunications and Information Exchange Between Systems-LAN/MAN Specific Requirements—Part 11: Wireless Medium Access Control (MAC) and physical layer (PHY) specifications: Amendment: ESS Mesh Networking".

The IEEE 802.11e specification specifies transmitting packets using a Carrier Sense Multiple Access with Collision Avoidance (CSMA/CA) mechanism. For example, a first station that has a packet to transmit determines if the wireless transmission medium is in use, i.e., if any data is currently being transmitted on the wireless transmission medium. If the medium is in use by a second station, the first station defers its transmission until detecting that the wireless medium is quiescent (i.e., is not currently transmitting any data; inactive) for at least a prescribed time interval. The first station can begin transmitting its data packet on the wireless transmission medium only after the medium has been quiescent for at least the prescribed time interval. The CSMA/CA mechanism is used only for unicast packet transmission, hence other wireless data packet traffic such as multicast packets or anycast packets can be retransmitted by the wireless network nodes 12 or 14 without relying on the collision avoidance mechanism.

Hence, if each of the mesh access points 12 receives a multicast packet from the centralized access point 16 in the wireless mesh network 10, the mesh access points 12 having overlapping transmission areas will encounter collisions upon retransmitting the same multicast packet at the same time.

Figure 2:
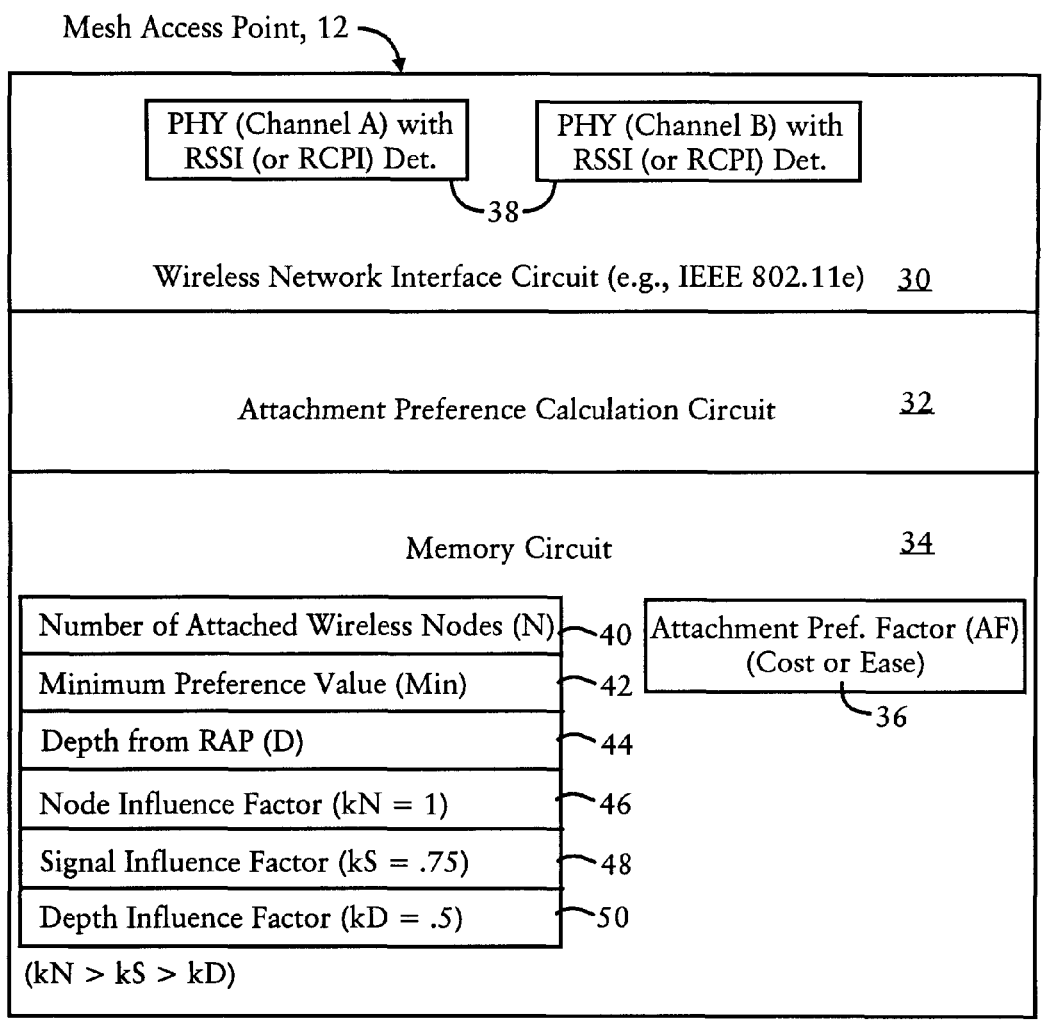
FIG. 2 illustrates an example mesh access point from the system of FIG. 1, according to an example embodiment.

According to the example embodiments described herein, each mesh access point 12 can calculate a corresponding attachment preference factor (AF) 36, illustrated in FIG. 2, that can be used by at least one other wireless network node 14 for selectively attaching to the corresponding mesh access point 12. Each wireless network node 14, in response to receiving mesh advertisement messages from multiple mesh access points 12 advertising respective attachment preference factors (AF), can determine whether to attach to a given mesh access point 12 based on its corresponding attachment preference factor (AF). Hence, a given wireless network node 14 can selectively attach to the one mesh access point 12 advertising the highest attachment preference factor (AF) from among the mesh advertisement messages received by the wireless network node 14. Moreover, each mesh access point 12 can increase its attachment preference factor (AF) based on a corresponding increase in the number (N) of attached wireless network nodes. Consequently, mesh access points (e.g., "P1", "P3", "P5") 12 having a greater number of currently-attached wireless network nodes can advertise a higher attachment preference factor (AF) relative to other mesh access points (e.g., "P2", "P4") 12 that have fewer or no attached wireless network nodes 14. The higher attachment preference factors (AF) advertised by the mesh access points "P1", "P3", "P5" (i.e., "preferred mesh access points") 12 also can cause wireless network nodes 14 that are attached to the other mesh access points "P2" or "P4" 12 having lower respective attachment preference factors (i.e., "lesser mesh access points") to migrate to the preferred mesh access points "P1", "P3", "P5" by attaching to one of the preferred mesh access points, including registering with the preferred mesh access point, and detaching from the lesser mesh access point (e.g., passively by ceasing communications with the lesser mesh access points, or actively by sending a de-register message). The registration by the wireless network node 14 with the preferred mesh access point (e.g., "P1", "P3", or "P5") causes that preferred mesh access point to further increase its corresponding attachment preference factor (AF).

Hence, any mesh access point (e.g., "P2", "P4") 12 that does not have any attached wireless network node 14 can suppress retransmission of a multicast packet or anycast packet transmitted by the centralized access point 16, in order to avoid interference with neighboring mesh access points (e.g., "P1", "P3", "P5") 12 that have attached wireless network nodes 14.

The attachment preference factors (AF) calculated by each of the mesh access points 12 can be calculated automatically, such that the attachment preference factors (AF) are updated based on the random attachments by the wireless network nodes 14, as well as other parameters such as signal strength or depth of the mesh access point 12. For example, the attachment preference factor (AF) can be adjusted based on various factors including received signal strength indicator (RSSI), or received channel power indicator (RCPI) as described in the IEEE 802.11k. The IEEE P802.11s specification also describes an airtime link metric computation procedure that reflects the amount of channel resources consumed by transmitting the frame over a particular link, measured in terms of bit rate and frame error rate for a given test frame size.

The attachment preference factor (AF) also can be calculated by each mesh access point 12 based on a corresponding minimum preference value (Min) supplied for example by a controller 22, enabling the controller 22 to add a bias towards selected mesh access points 12.

FIG. 2 illustrates an example mesh access point 12, according to an example embodiment. The mesh access point 12 includes a wireless network interface circuit 30, an attachment preference calculation circuit 32, and a memory circuit 34.

The wireless network interface circuit 30, implemented for example according to IEEE 802.11, IEEE 802.11e, and IEEE P802.11s, can include one or more physical layer (PHY) transceiver circuits 38 and a Carrier Sense with Multiple Access and Collision Avoidance (CSMA/CA) circuit (not shown) for unicast packets. The physical layer transceiver circuit 38 can be configured for detecting the received signal strength of a received data packet on a wireless link 24, and outputting for the wireless network interface circuit 30 a corresponding received signal strength indicator (RSSI); alternately, the physical layer transceiver circuit 38 also can detect and report a received channel power indicator (RCPI) value. Each physical layer transceiver circuit 30 can be configured for transmitting and receiving on a corresponding wireless channel (e.g., Channel A or Channel B); for example, the mesh access point (e.g., "P1") 12 can be configured for sending and receiving data to and from the centralized access point 16 via a first channel (e.g., Channel A), and sending and receiving data to and from each attached wireless network node (e.g., C1, C2, C3, C4, C5) 14 via a second channel (e.g. Channel B). In this example, each of the mesh access points 12 can communicate with the centralized access point 16 via "Channel A", and with their respective attached wireless network nodes 14 via "Channel B".

As described in further detail below with respect to FIG. 3, the attachment preference calculation circuit 32 within the mesh access point 12 can be configured for detecting the number (N) 40 of wireless network nodes 14 that are attached to the mesh access point 12 (i.e., the number of attached wireless network nodes). For example, FIG. 1 illustrates that the wireless network nodes "C1", "C2", "C3", "C4", and "C5" 14 currently are attached to the mesh access point "P1" 12. Hence, the attachment preference calculation circuit 32 within the mesh access point "P1" 12 can detect the number (N) of wireless network nodes 14 that are attached to the mesh access point "P1" (i.e., "C1", "C2", "C3", "C4", and "C5") as equal to five ("5").

The attachment preference calculation circuit 32 in the mesh access point 12 also can calculate the attachment preference factor (AF) based on the number (N) of wireless network nodes 14 that are attached to the mesh access point 12. The attachment preference calculation circuit 32 also can be configured for suppressing retransmission of a multicast packet, received from the centralized access point 16, based on determining the number (N) of attached wireless network nodes 14 equals zero.

The memory circuit 34 can be configured for storing various parameters used by the attachment preference calculation circuit 32 in calculating the attachment preference factor (AF). As illustrated in FIG. 2, the memory circuit 34 can be configured for storing the attachment preference factor (AF) 36, the number (N) 40 of attached wireless network nodes, a minimum preference value (Min) 42, and a depth (D) of the mesh access point 12 relative to the centralized access point 16.

The memory circuit 34 also can be configured for storing various influence factors representing respective rates of influence for parameters used in calculating the attachment preference factor (AF) 36. For example, the memory circuit 34 can be configured for storing a node influence factor (kN) 46 representing a corresponding influence rate for adding the number of attached wireless network nodes 40 to the attachment preference factor (AF) 36. The memory circuit 34 also can be configured for storing a signal influence factor (kS) 48 representing a corresponding influence rate for adding the corresponding signal strength (e.g. as detected by the corresponding PHY transceiver 38 in communication with its corresponding attachment mesh point). The memory circuit 34 also can be configured for storing a depth influence factor (kD) 50 representing a corresponding influence rate for adding the corresponding depth 44 to the attachment preference factor (AF) 36. As illustrated in FIG. 2, the node influence factor 46 can be greater than the signal influence factor 46, and the signal influence factor 48 can be greater than the depth influence factor; hence, the number (N) 40 of attached wireless network nodes can have the greatest influence on the attachment preference factor (AF) 36, the signal strength (measured by the transceiver 38) from the attachment mesh point (e.g., the rooftop access point 16) can have the next greatest influence on the attachment preference factor (AF) 36, and the depth 44 of the mesh access point 12 can have the least influence on the attachment preference factor (AF) 36.

The memory circuit 34 also can be configured for storing other various parameters (not shown).

Any of the disclosed circuits of the mesh access point 12 (including the network interface circuit 30, the attachment preference calculation circuit 32, and the memory circuit 34), or any of the attached wireless network nodes 14, can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown), where execution of executable code stored in an internal memory circuit (e.g., within the memory circuit 34) causes the processor circuit to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 34 can be implemented dynamically by the attachment preference calculation circuit 32, for example based on memory address assignment and partitioning executed by the attachment preference calculation circuit 32.

Figure 3:
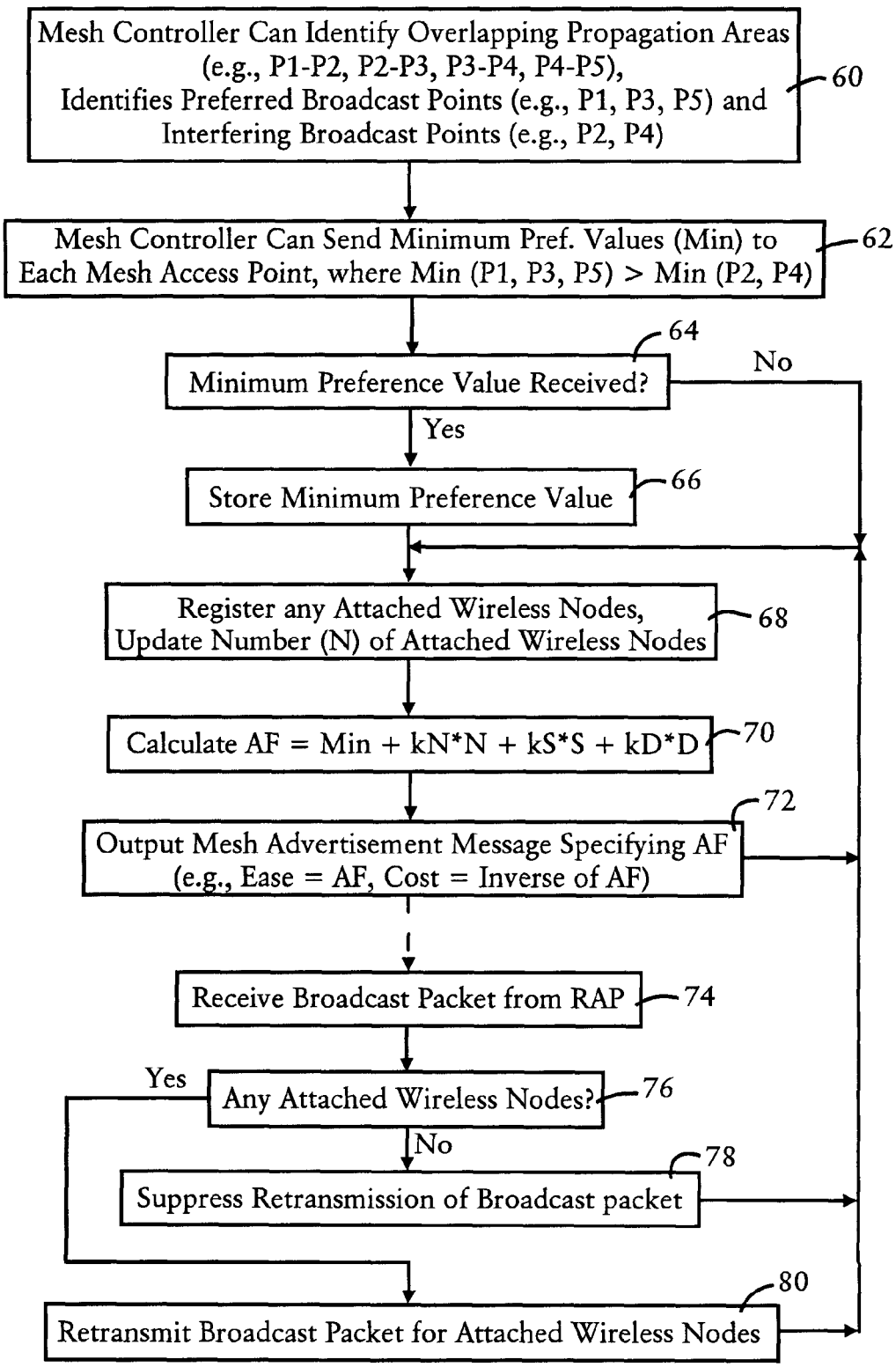
FIG. 3 illustrates an example method in the mesh network of clustering wireless network nodes, according to an example embodiment.

FIG. 3 illustrates an example method for enabling a mesh access point 12 to automatically calculate an attachment preference factor (AF) that enables automatic clustering of wireless network nodes to selected mesh access points, according to an example embodiment. The steps described in FIG. 3 can be implemented as executable code stored on a computer readable medium (e.g., floppy disk, hard disk, ROM, EEPROM, nonvolatile RAM, CD-ROM, etc.) that are completed based on execution of the code by a processor; the steps described herein also can be implemented as executable logic that is encoded in one or more tangible media for execution (e.g., programmable logic arrays or devices, field programmable gate arrays, programmable array logic, application specific integrated circuits, etc.).

As described previously, each mesh access point 12 can automatically begin calculating an attachment preference factor (AF) 36, or can calculate the attachment preference factor (AF) 36 based on a received minimum attachment preference value (Min) 42 that can bias the mesh access point 12 accordingly. For example, if the mesh access points 12 are configured for receiving minimum attachment preference values 42, a controller 22 can generate the respective minimum attachment preference values 42 in step 60, for example based on identifying overlapping propagation areas, and identifying preferred broadcast points and interfering broadcast points.

For example, assume in FIG. 1 that: the mesh access points "P1" and "P2" have an overlapping propagation area (identified as "P1-P2"); the mesh access points "P2" and "P3" have an overlapping propagation area (identified as "P2-P3"); the mesh access points "P3" and "P4" have an overlapping propagation area (identified as "P3-P4"); and the mesh access points "P4" and "P5" have an overlapping propagation area (identified as "P4-P5"). If the attached wireless network nodes 14 were evenly distributed among the mesh access points 12, numerous collisions would be encountered each time the mesh access points 12 attempted to retransmit a multicast packet received from the centralized access point 16. Hence, the controller 22 (or a network administrator that is configuring the network 10 via the controller 22) can identify in step 60 the mesh access points "P1" and "P5" as preferred broadcast points based on having the maximum number of non-overlapping transmission areas (i.e., minimum number of overlapping transmission areas), and "P3" based on not interfering with the preferred broadcast points "P1" and "P5". Similarly, the mesh access points "P2" and "P4" can be identified in step 60 by the mesh controller 22 as interfering broadcast points based on the overlapping transmission or propagation areas.

Hence, the mesh controller 22 can send in step 62 minimum preference values 42 to each of the mesh access points 12, where the preferred broadcast points (e.g., "P1", "P3", and "P5") can receive minimum preference values 42 that are greater than the respective minimum preference values 42 assigned to the interfering broadcast points (e.g., "P2", "P4").

Referring to step 64, each mesh access point (e.g., "P1") 12 can determine whether a received minimum preference value 42 is received from the mesh controller 22. As described previously, the attachment preference calculation circuit 32 can independently generate its own attachment preference factor (AF) 36, without the necessity of any bias introduced by the minimum preference value 42 from the controller 22. If, however, a minimum preference value is received by the wireless network interface circuit 30 of the mesh access point 12, the attachment preference calculation circuit 32 stores in step 66 the minimum preference value 42 into the memory circuit 34.

As described below, the attachment preference calculation circuit 32 can generate mesh advertisement messages that specify the corresponding attachment preference factor (AF) 36: if any attached wireless network nodes 14 are detected by the attachment preference calculation circuit 32 (e.g., based on receiving a registration from the attached wireless node), the attachment preference calculation circuit 32 can register in step 68 the attached wireless network nodes 14, and update the number (N) 40 of attached wireless nodes.

The attachment preference calculation circuit 32 calculates in step 70 the attachment preference factor (AF) 36 based on the number (N) 40 of attached wireless nodes 14. For example, the attachment preference calculation circuit 32 can determine in step 70 the number (N) of attached wireless nodes 40, the signal strength "S" (e.g., RSSI, RCPI, etc.) of the wireless signal transmitted by the corresponding attachment access point (e.g., the rooftop access point 16), and the corresponding depth (D) 44 of the mesh access point 12 relative to the centralized access point 16. The attachment preference calculation circuit 32 also can apply in step 70 the respective influence factors 46, 48, and 50 to the number (N) of attached wireless nodes 40, the signal strength "S" of the wireless signal transmitted by the attachment access point (e.g., RAP 16), and the depth (D) 44. Assuming no bias is added by the mesh controller 22, the attachment preference calculation circuit 32 can calculate the attachment preference factor (AF) 36 based on the weighted values of the number of attached nodes (kN*N), the weighted signal strength (kN*N), and the weighted depth (kD*D). If the mesh access point 12 has received a bias value 42 from the mesh controller 22, the attachment preference calculation circuit 32 also can add the bias value 42 to the attachment preference factor (AF) 36.

The attachment preference calculation circuit 32 can generate in step 72 a mesh advertisement message for output by the wireless network interface circuit 30 on the channel (e.g., Channel B) serving wireless network nodes seeking to selectively attach to the mesh access point "P1" 12. The mesh advertisement message output in step 72 can specify the attachment preference factor (AF) 36 either in the form of an "ease" factor identifying a corresponding ease in attaching to the mesh access point "P1" 12 relative to the RAP 16, or in the form of a cost for attaching to the mesh access point "P1" 12. As will become apparent, the attachment preference factor (AF) 36 also can be based on an aggregation of other cost or ease factors of "upstream" attachment points relied upon in reaching the centralized access point 16.

Hence, each mesh access point within the mesh network 10 can calculate its own corresponding attachment preference factor (AF) 36 based on the corresponding number (N) 40 of attached wireless network nodes, the corresponding signal strength (S) detected from the corresponding attachment access point, and the corresponding depth (D) 44 of the mesh access point. The depth (D) 44 refers to the distance of the mesh access point 12 relative to the centralized access point 16, expressed for example as a number of hops. Although FIG. 1 illustrates the mesh access points (e.g., "P1", "P2", "P3", "P4", and "P5") 12 each having the depth of one hop from the centralized access point 16, another wireless network node 14 implemented as a mesh access point (e.g., "C3") can generate its own corresponding attachment preference factor (AF) 36 based on its corresponding number (N) 40 of attached nodes (not shown), the corresponding signal strength (S) detected from its corresponding attachment access point "P1" 12, and its corresponding depth (D) 44 of two hops from the centralized access point 16. Any mesh access point (not shown) attached to the mesh access point "C3" also can calculate its own corresponding attachment preference factor (AF) 36 based on its corresponding depth (D) 44 of three hops from the RAP 16, etc.

As illustrated in FIG. 3, the attachment preference calculation circuit 32 can monitor in step 68 for any increase in the number (N) 40 of attached wireless network nodes, and can increase the attachment preference factor (AF) 36 accordingly; similarly, the attachment preference factor (AF) 36 can be adjusted based on changes in the signal strength (S) for the corresponding attachment access point, or a change in the depth by the mesh access point 12 (e.g., by attaching to a new attachment access point having a different depth relative to the prior attachment access point). Hence, if additional wireless network nodes begin attaching to the mesh access point "P1" 12, the attachment preference calculation circuit 32 increases in step 70 the attachment preference factor (AF) 36 accordingly, resulting in a greater probability that additional wireless network nodes will attach to the mesh access point "P1" 12; conversely, if the attachment preference calculation circuit 32 detects a decrease in the number (N) 40, the attachment preference calculation circuit 32 can decrease in step 70 the attachment preference factor (AF) 36 accordingly, resulting in a lesser probability that additional wireless network nodes will attach to the mesh access point "P1" 12, and a greater probability that the currently-attached wireless network nodes may migrate to another mesh access point.

Consequently, the wireless network nodes 14 can automatically cluster toward mesh access points (e.g., "P1", "P3", and "P5") having a larger number of attached wireless network nodes 14, and avoid the other mesh access points having few or no attached wireless network nodes 14. As illustrated in FIG. 3, if in step 74 the network interface circuit 30 of a mesh access point 12 receives a broadcast or multicast packet from the centralized access point 16, the attachment preference calculation circuit 32 determines in step 76 whether there are any attached wireless nodes, based on the stored number of attached wireless nodes 40. For example, in the case of the mesh access point "P1" 12, in response to the corresponding attachment preference calculation circuit 32 detecting a nonzero number of attached wireless nodes 14, the attachment preference calculation circuit 32 can cause the wireless network interface circuit 30 to retransmit in step 80 the broadcast packet or multicast packet for the attached wireless nodes 14. In the case of the mesh access points "P2" or "P4", since in step 76 the corresponding attachment preference calculation circuit 32 determines there are no attached nodes, the corresponding attachment preference calculation circuit 32 can suppress in step 78 the retransmission of the broadcast or multicast packet in order to avoid interference with other mesh access points (e.g., "P1", "P3", "P5") that have attached wireless network nodes 14.

According to the example embodiments, mesh access points can automatically determine their own attachment preference factors based on the number of attached wireless network nodes. Hence, wireless network nodes can selectively attach to the mesh access points advertising the highest attachment preference factors, and migrate away from other mesh access points advertising lesser attachment preference factors. Consequently, redundant mesh access points within overlapping transmission areas and without any attached wireless network nodes can be configured to suppress transmission of multicast packets that may interfere with other mesh access points.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   detecting by a mesh access point a number of wireless network nodes that are attached to the mesh access point within a mesh network;
   calculating by the mesh access point an attachment preference factor that enables at least one other wireless network node to determine whether to attach to the mesh access point, wherein the mesh access point increases the attachment preference factor based on a corresponding increase in the number of wireless network nodes that are attached to the mesh access point; and outputting by the mesh access point the attachment preference factor, enabling the at least one other wireless network node to determine whether to attach to one of the mesh access point or a second mesh access point based on the one mesh access point advertising a higher corresponding attachment preference factor based on a higher corresponding number of attached wireless network nodes.

2. The method of claim 1, wherein:

the attachment preference factor is expressed as at least one of a cost factor or an ease factor;

the cost factor identifying the attachment preference factor as a corresponding cost for the at least one other wireless network node to attach to the mesh access point;

the ease factor identifying the attachment preference factor as a corresponding ease for the at least one other wireless network node to attach to the mesh access point.

3. The method of claim 1, further comprising determining, by the mesh access point, a signal strength of a wireless signal transmitted by an attachment access point used by the mesh access point, the calculating including increasing the attachment preference factor based on a corresponding increase in the signal strength.

4. The method of claim 3, wherein the attachment preference factor is based on:

applying a first influence rate to the number of wireless network nodes that are attached to the mesh access point; and applying a second influence rate to the signal strength, the first influence rate greater than the second influence rate.

5. The method of claim 4, further comprising:

determining by the mesh access point a depth of the mesh access point relative to a centralized access point within the mesh network;

wherein the attachment preference factor is based on applying a third influence rate to the depth, the third influence rate less than the second influence rate, the calculating including increasing the attachment preference factor based on a corresponding increase in the depth.

6. The method of claim 1, further comprising:

determining by the mesh access point a depth of the mesh access point relative to a centralized access point within the mesh network;

wherein the attachment preference factor is based on applying a first influence rate to the number of wireless network nodes that are attached to the mesh access point, and applying a second influence rate to the depth, the second influence rate less than the first influence rate;

wherein the calculating includes increasing the attachment preference factor based on a corresponding increase in the depth.

7. The method of claim 1, wherein the outputting includes outputting a mesh advertisement message that specifies the attachment preference factor.

8. The method of claim 1, further comprising:

receiving by the mesh access point a multicast packet from a centralized access point within the mesh network; and the mesh access point suppressing retransmission of the multicast packet into the mesh network if the number of wireless network nodes that are attached to the mesh access point equals zero.

9. The method of claim 1, further comprising:

receiving by the mesh access point a minimum attachment preference factor from a centralized access point in the mesh network;

wherein the calculating includes calculating the attachment preference factor relative to the minimum attachment preference factor.

10. An apparatus comprising:

an attachment preference calculation circuit configured for detecting a number of wireless network nodes that are attached to the apparatus within a mesh network, calculating an attachment preference factor that enables at least one other wireless network node to determine whether to attach to the apparatus, and increasing the attachment preference factor based on detecting a corresponding increase in the number of wireless network nodes that are attached to the apparatus; and a network interface circuit configured for outputting the attachment preference factor, enabling the at least one other wireless network node to determine whether to attach to one of the apparatus as a first mesh access point or a second mesh access point based on the one mesh access point advertising a higher corresponding attachment preference factor based on a higher corresponding number of attached wireless network nodes.

11. The apparatus of claim 10, wherein:

the attachment preference factor is expressed as at least one of a cost factor or an ease factor;

the cost factor identifying the attachment preference factor as a corresponding cost for the at least one other wireless network node to attach to the apparatus;

the ease factor identifying the attachment preference factor as a corresponding ease for the at least one other wireless network node to attach to the apparatus.

12. The apparatus of claim 10, wherein the network interface circuit is configured for determining a signal strength of a wireless signal transmitted by an attachment access point used by the apparatus, the attachment preference calculation circuit configured for increasing the attachment preference factor based on a corresponding increase in the signal strength.

13. The apparatus of claim 12, wherein the attachment preference calculation circuit is configured for calculating the attachment preference factor based on:

applying a first influence rate to the number of wireless network nodes that are attached to the apparatus; and applying a second influence rate to the signal strength, the first influence rate greater than the second influence rate.

14. The apparatus of claim 13, wherein the attachment preference calculation circuit is configured for:

determining a depth of the apparatus relative to a centralized access point within the mesh network;

calculating the attachment preference factor based on applying a third influence rate to the depth, the third influence rate less than the second influence rate; and increasing the attachment preference factor based on a corresponding increase in the depth.

15. The apparatus of claim 10, wherein the attachment preference calculation circuit is configured for:

determining a depth of the apparatus relative to a centralized access point within the mesh network;

calculating the attachment preference factor based on applying a first influence rate to the number of wireless network nodes that are attached to the apparatus, and applying a second influence rate to the depth, the second influence rate less than the first influence rate; and increasing the attachment preference factor based on a corresponding increase in the depth.

16. The apparatus of claim 10, wherein the network interface circuit is configured for outputting a mesh advertisement message that specifies the attachment preference factor.

17. The apparatus of claim 10, wherein:
the network interface circuit is configured for receiving a multicast packet from a centralized access point within the mesh network;
the attachment preference calculation circuit is configured for suppressing retransmission of the multicast packet into the mesh network if the number of wireless network nodes that are attached to the apparatus equals zero.

18. The apparatus of claim 10, wherein:
the network interface circuit is configured for receiving a minimum attachment preference factor from a centralized access point in the mesh network;
the attachment preference calculation circuit is configured for calculating the attachment preference factor relative to the minimum attachment preference factor.

19. An apparatus comprising:
means for detecting a number of wireless network nodes that are attached to the apparatus within a mesh network, the means for detecting further configured for calculating an attachment preference factor that enables at least one other wireless network node to determine whether to attach to the apparatus, and increasing the attachment preference factor based on detecting a corresponding increase in the number of wireless network nodes that are attached to the apparatus; and
means for outputting the attachment preference factor, enabling the at least one other wireless network node to determine whether to attach to one of the apparatus as a first mesh access point or a second mesh access point based on the one mesh access point advertising a higher corresponding attachment preference factor based on a higher corresponding number of attached wireless network nodes.

* * * * *